Aug. 31, 1954   R. C. BULLINGTON   2,687,919
JET AIR LIFT CONDUIT
Filed Dec. 27, 1950
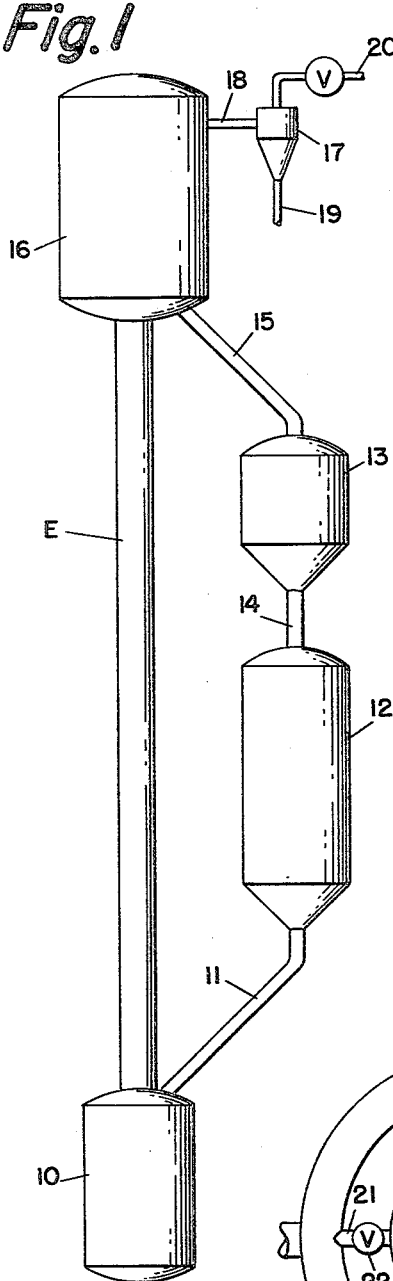
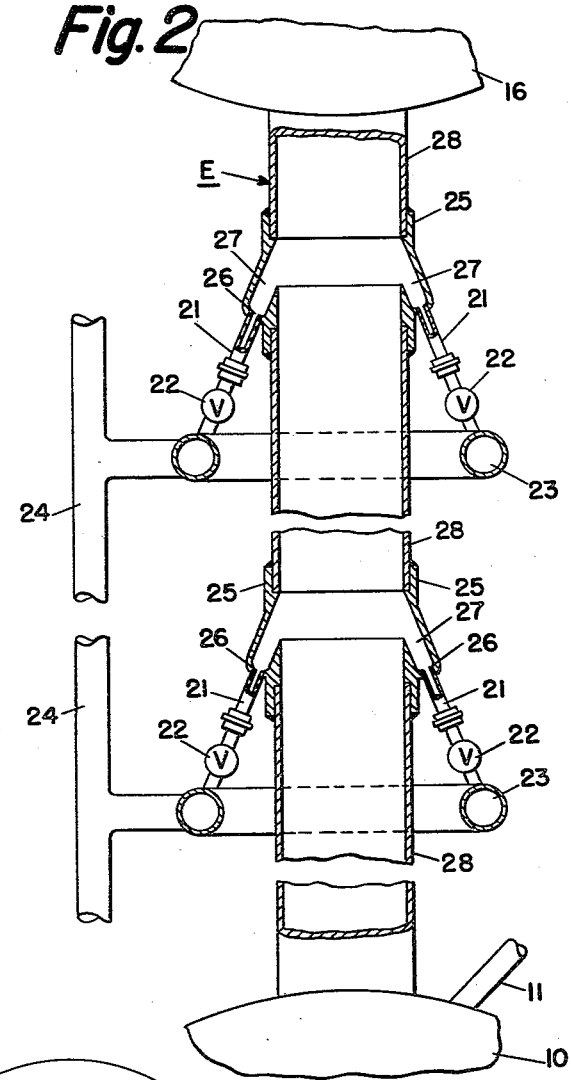
INVENTOR.
RUBY C. BULLINGTON
BY
Busser and Harding
ATTORNEYS

Patented Aug. 31, 1954

2,687,919

UNITED STATES PATENT OFFICE 2,687,919

JET AIR LIFT CONDUIT

Ruby C. Bullington, Collingswood, N. J., assignor to Sun Oil Company, Philadelphia, Pa., a corporation of New Jersey Application December 27, 1950, Serial No. 202,971

1 Claim. (Cl. 302—17)

This invention relates to a system and apparatus for moving pneumatically granular or pelleted contact material or catalyst from a lower vessel, which receives the material in a continuous stream, upwardly into an upper vessel. In particular the invention is directed to apparatus for supplying gas, air or other fluid lifting medium to the material in the lift conduit in order to convey it therefrom to and through an elevating conduit in such a manner as to reduce attrition of the material particles or pellets to a minimum during passage to the upper vessel.

It is well known in the art of catalytic operations, such as the cracking of heavier petroleum fractions to gasoline and other hydrocarbon processing operations to use granular or pelleted catalytic or contact material in a continuous system. In such systems a conversion zone is operated continuously to produce the desired product while a second zone operates continuously in regeneration. Most commercial moving catalyst systems have the conversion zone and regeneration zone in superposed relationship with the conversion zone usually above the regeneration zone so that the catalyst or contact material moves through the conversion zone to the regeneration zone by gravity and after regeneration it is carried upwardly and returned to the conversion zone to repeat the cycle of operation. To return the catalyst or contact material from the lower regeneration zone to the upper conversion zone two well known means applicable to the transportation of granular solids from one locus to another have been used, namely, by mechanical conveyers and by pneumatic conveyers, in the latter of which air, steam or flue gas produced at the refinery is readily available as the pneumatic lifting medium.

It is necessary in systems employing conversion and regeneration zones in superposed relationship to convey the catalyst or contact material which is in pelleted or granular form continuously upwardly to a height of several hundred feet, in order that it can be delivered continuously by gravity to the conversion and regeneration zones to maintain them in operation. Conveying the material upwardly by a fluid medium requires a vessel positioned at a level below that of the lower reaction zone which is designed to initiate the lifting or upward conveying operation. This lowermost vessel is generally known in the art as an engager since the material is engaged therein by the lifting fluid to effect the lifting operation. An elevating or a lift conduit has its lower end extending into or is in communication with the engager vessel while its upper end communicates with an upper vessel positioned at a level above the level of the upper end of the upper reaction zone or chamber. The upper vessel is designed so that the lifting medium is separated from the catalyst or contact material and is generally known as the disengager.

Specifically the present invention is directed to the elevating or lift portion of a continuous catalyst or contact material system and the particular arrangement for elevating the contact material from the engager to the disengager with a minimum of attrition of the material during the elevating operation.

Referring to Figure 1, the engager is indicated at 10 and receives the catalyst or contact material by gravity continuously through line 11 from the regeneration zone 12 positioned below the upper conversion zone 13 which is in communication with zone 12 through line 14. The conversion zone 13 receives the material by gravity continuously by line 15 from the disengager 16. Means for elevating the contact material from the engager 10 to the disengager 16 is shown generally at E. Separating means such as a cyclone separator 17 is in communication with the disengager 16 through line 18 and fines are removed from the separator through line 19 while the lifting medium is removed from the separator through line 20. Figure 1 does not show any details of the present invention and is provided only to show the general arrangement of a system wherein catalyst or contact material is utilized in the form of a continuously moving mass.

Referring to Figure 2 only a portion of the engager 10 and disengager 16 is shown since the invention is concerned only with the elevating or lift conduit E positioned therebetween. It will be understood, however, that contact material will be supplied continuously to the engager 10 through conduit 11 and that a body or mass of the contact material will be maintained in the engager 10. The contact material can be moved from the engager 10 into the elevating conduit E, for example, in accordance with the teaching of the application of John F. McKinney, Jr., Serial No. 184,601, filed September 13, 1950, for "Method and Apparatus for Elevating Contact Material," wherein is disclosed the utilization of several lifting fluid streams applied directly to the body of material in the engager to force the material upwardly into the elevating conduit.

As the material advances through the lift conduit at some desired or predetermined velocity the conduit according to the present invention is designed to pick-up the material by the utilization of jets or nozzles spaced longitudinally of the conduit E. At each zone of pick-up the lifting fluid can be supplied through the jets or nozzles at a relatively low velocity in order that the material on entering the disengager 16 will be reduced in velocity to a degree that little or no attrition of the material in the disengager 16 will take place which often occurs when the lifting fluid is supplied directly at high velocity to the bed C of material in the engager.

In order to carry out the invention the conduit E, as shown, in Figures 2 and 3 is provided with a plurality of nozzles 21 spaced longitudinally between the engager and disengager. The nozzles, as shown, are arranged in sets of four spaced circumferentially of the conduit although any desired number may be used. The nozzles are each provided with a valve 22 and the nozzles of each set are in communication with a ring manifold 23 and the manifolds are connected to a common lifting medium supply conduit 24.

As shown in Figure 2 it is also preferred to position the nozzles with respect to the conduit at an acute angle in order to provide for optimum lifting effect by the fluid. The nozzles can be secured to the conduit E in any desired manner but one means, as shown in Figure 2, is to secure the nozzle 21 of each set to an exterior joint 25 having a plurality of openings 26 therein for the reception of the nozzle ends. In the particular joint structure shown a channel or pocket 27 is formed, by swaging the wall of the joint outwardly to provide a space into which the lifting medium is directed. Joint 25 secures the ends of adjacent sections 28 together.

Since the invention is directed to the idea of elevating the contact material by supplying the lifting medium to zones spaced lengthwise of the conduit it will of course be understood that the jets or nozzles may be positioned on the conduit in any desired relation.

I claim:

In apparatus for elevating granular contact material from a lower vessel to an upper vessel through an elevating conduit, the improvement which comprises a plurality of conduit sections providing unrestricted flow and secured together by a plurality of exterior joints, each of said joints having its wall swaged outwardly to form an annular pocket about the periphery of the conduit wall, each of said pockets being disposed at an acute angle to the conduit and in communication therewith, a plurality of sets of nozzles, the nozzles in each set being aligned with and having their inner ends communicating with a pocket, a plurality of ring manifolds each surrounding said conduit to receive the outer ends of a set of nozzles and means for supplying a lifting fluid simultaneously to said manifolds.

References Cited in the file of this patent
UNITED STATES PATENTS

| Number | Name | Date |
|---|---|---|
| 646,640 | Evans | Apr. 3, 1900 |
| 1,202,088 | Murray | Oct. 24, 1916 |
| 1,232,393 | Piper | July 3, 1917 |
| 1,819,346 | Tolman | Aug. 18, 1931 |
| 2,509,983 | Morrow | May 30, 1950 |